US012732070B2

(12) United States Patent
Lee

(10) Patent No.: US 12,732,070 B2
(45) Date of Patent: Sep. 8, 2026

(54) COLLECTION NET FOR RESTRICTING LEAKAGE CURRENT OF UNDERWATER MOTOR

(71) Applicant: VISION TECH Corporation, Busan (KR)

(72) Inventor: Jin Sung Lee, Busan (KR)

(73) Assignee: VISION TECH Corporation, Busan (KR)

( * ) Notice: Subject to any disclaimer, the term of this patent is extended or adjusted under 35 U.S.C. 154(b) by 200 days.

(21) Appl. No.: 18/641,426

(22) Filed: Apr. 21, 2024

(65) Prior Publication Data

US 2025/0125694 A1 Apr. 17, 2025

(30) Foreign Application Priority Data

Oct. 12, 2023 (KR) ........................ 10-2023-0135555

(51) Int. Cl.
*H02K 11/40* (2016.01)
*H02K 5/132* (2006.01)

(52) U.S. Cl.
CPC ............. *H02K 11/40* (2016.01); *H02K 5/132* (2013.01)

(58) Field of Classification Search
CPC ............................... H02K 11/40; H02K 5/132
See application file for complete search history.

(56) References Cited

U.S. PATENT DOCUMENTS 6,218,754 B1 4/2001 Alekperov et al.
2010/0301713 A1* 12/2010 Breuning ............... H02K 11/33 310/68 C
2015/0198931 A1 7/2015 Lee
2019/0164670 A1 5/2019 Holzmueller et al.

FOREIGN PATENT DOCUMENTS

CN 211908583 U 11/2020
DE 102014002476 A1 * 8/2014 ......... F04D 29/5813
EP 2112749 A2 * 10/2009 ............ F04C 23/008
KR 20-0339079 Y1 1/2004
KR 10-1404806 B1 6/2014
KR 10-1441366 B1 9/2014
KR 10-2021-0047033 A 4/2021
KR 10-2487110 B1 1/2023
KR 10-2023-0061805 A 5/2023
KR 10-2671149 B1 5/2024

OTHER PUBLICATIONS

Japanese Notice of Allowance dated Oct. 28, 2025 from Japanese Patent Office for Application No. 2024-069027.
Non-final Office Action mailed Oct. 25, 2024 from the Korean Patent Office for Korean Application No. 10-2023-0135555.
Non-final Office Action mailed May 12, 2025 from the Korean Patent Office for Korean Application No. 10-2023-0135555.
Korean Office Action mailed on Nov. 19, 2025 from Ministry of Intellectual Property for Application No. 10-2023-0135555.

* cited by examiner

*Primary Examiner* — Viet P Nguyen

(57) ABSTRACT

Disclosed is a collection net for restricting leakage current of an underwater motor implemented to restrict inflow of leakage current leaking from phase voltage lines of a three-phase power cable connected to the underwater motor into the human body by increasing the area of a neutral line of the three-phase power cable configured to apply power to the underwater motor, so as to prevent electrical shock accidents.

3 Claims, 2 Drawing Sheets

COLLECTION NET FOR RESTRICTING LEAKAGE CURRENT OF UNDERWATER MOTOR

BACKGROUND OF THE INVENTION

Field of the Invention

The present invention relates to leakage current restriction technology, and more particularly, to a collection net for restricting leakage current of an underwater motor.

Description of the Related Art

An underwater motor is used in places, such as an immersion tank which serves to collect water flowing from drains and discharged into a septic tank or a collection well and to cause foreign substances to settle.

However, in the past, there is no function of restricting leakage current leaking from phase voltage lines R, S, and T of a three-phase power cable which applies power to the underwater motor used in the immersion tank, and the like, and thus, when the human body comes into contact with water in which current leaking from the underwater motor flows, an electrical shock accident occurs.

Korean Patent Registration No. 10-1404806 (Registration Date: May 30, 2014), which was previously filed by the applicant of the present invention discloses a circuit breaker having an electrical shock prevention function, in which a flat conductor with a greater cross-sectional area than the cross-sectional area of a wire is connected to an output terminal connected to a transmission and distribution path of electrical equipment so as to reduce current flowing in the human body coming into contact with leakage current to prevent electrical shock accidents.

This technology prevents electrical shock by restricting leakage current using a difference in area between conductor electrodes, and the present inventor(s) have conducted research and development on technology that can prevent electrical shock of the human body by applying this technology of restricting leakage current using the difference in area between the conductor electrodes to an underwater motor.

RELATED ART DOCUMENTS

Patent Documents

Korean Patent Registration No. 10-1404806 (Publication Date: Jun. 12, 2014)

SUMMARY OF THE INVENTION

Therefore, the present invention has been made in view of the above problems, and it is an object of the present invention to provide a collection net for restricting leakage current of an underwater motor, which may restrict inflow of leakage current leaking from phase voltage lines R, S, and T of a three-phase power cable connected to the underwater motor into the human body by increasing the area of a neutral line of the three-phase power cable configured to apply power to the underwater motor.

In accordance with the present invention, the above and other objects can be accomplished by the provision of a collection net for restricting leakage current of an underwater motor, including a cylindrical main body formed of a conductive material, and configured to accommodate the underwater motor therein and to increase an area of a neutral line of a three-phase power cable connected to the underwater motor by connecting the neutral line to an inner surface of the cylindrical main body, so as to collect leakage current leaking from phase voltage lines of the three-phase power cable connected to the underwater motor, and a ground terminal mounted on an outer surface of the cylindrical main body formed of the conductive material, and connected to ground.

The cylindrical main body formed of the conductive material may have a circular cylindrical shape.

The cylindrical main body formed of the conductive material may have a polygonal cylindrical shape.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
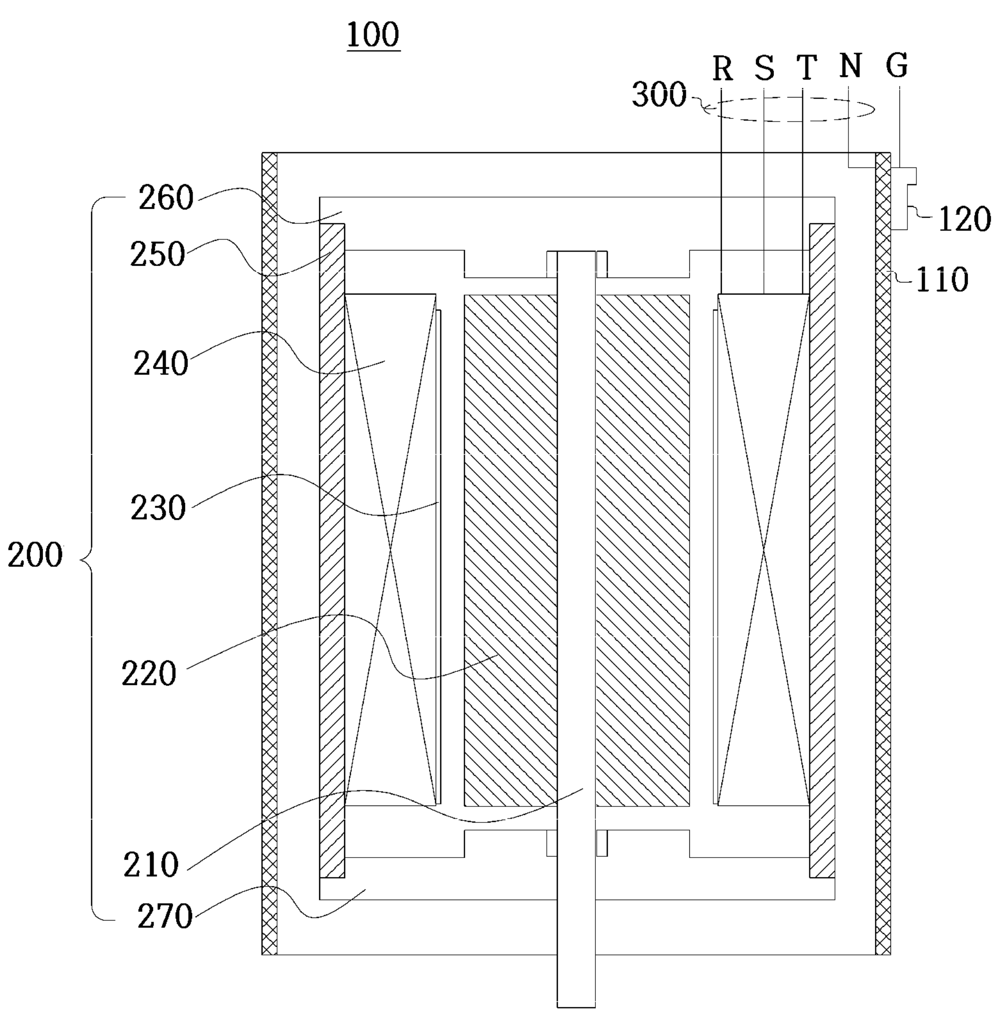
FIG. 1 is a longitudinal-sectional view showing a collection net for restricting leakage current of an underwater motor according to one embodiment of the present invention.

Hereinafter, the present invention will be described in detail through various embodiments with reference to the accompanying drawings to make the description of the present invention thorough and to fully convey the scope of the present invention to those skilled in the art. Although specific embodiments are illustrated in the drawings and the detailed description related thereto will be described, this is not intended to limit various embodiments of the present invention to any specific form.

In the following description of the present invention, a detailed description of known functions and configurations incorporated herein will be omitted when it may make the subject matter of the present invention rather unclear.

When an element or layer is referred to as being "on," "engaged with," "connected to," or "coupled to" another element or layer, it may be directly on, engaged with, connected to or coupled to the other element or layer, or intervening elements or layers may be present.

In contrast, when an element is referred to as being "directly on," "directly engaged with," "directly connected to," or "directly coupled to" another element or layer, there may be no intervening elements or layers present.

FIG. 1 is a longitudinal-sectional view showing a collection net for restricting leakage current of an underwater motor according to one embodiment of the present invention. As shown in FIG. 1, a collection net 100 for restricting leakage current of an underwater motor according to this embodiment includes a cylindrical main body 110, and a ground terminal 120.

The cylindrical main body 110 has a mesh structure formed of a conductive material, such as stainless steel, accommodates an underwater motor 200 therein, and is configured to increase the area of a neutral line N of a three-phase power cable 300 by connecting the neutral line N to the inner surface of the cylindrical main body 110, so as to collect leakage current leaking from phase voltage lines R, S, and T of the three-phase power cable 300 connected to the underwater motor 200.

Figures 2A, 2B, 2C:
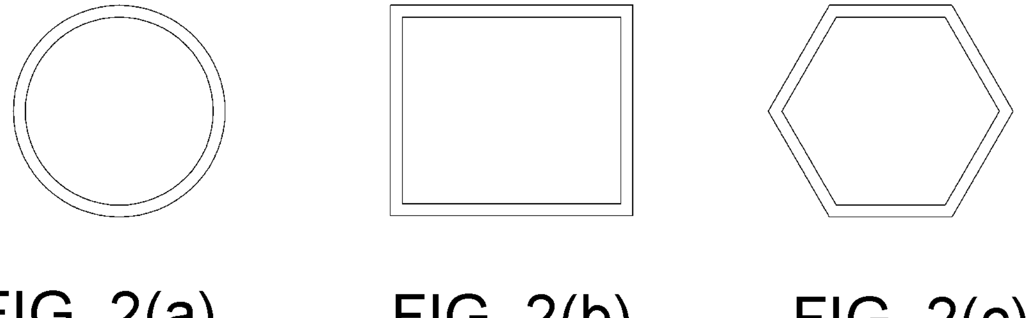
FIGS. 2(*a*), 2(*b*), and 2(*c*) are cross-sectional views showing cylindrical main bodies of the collection net for restricting leakage current of the underwater motor according to various embodiments of the present invention.

Here, the cylindrical main body 110 formed of the conductive material may be implemented in a circular cylindrical shape or a polygonal cylindrical shape. FIGS. 2(*a*), 2(*b*), and 2(*c*) are cross-sectional views showing cylindrical main bodies of the collection net for restricting leakage current of the underwater motor according to various embodiments of the present invention. FIG. 2(*a*) illustrates the cylindrical main body 110 formed of the conductive material which is implemented in a circular cylindrical shape, FIG. 2(*b*) illustrates the cylindrical main body 110 formed of the conductive material which is implemented in a square cylindrical shape, and FIG. 2(*c*) illustrates the cylindrical main body 110 formed of the conductive material which is implemented in a regular hexagonal cylindrical shape, respectively.

The underwater motor 200 includes a rotating shaft 210, a rotor 220 including a permanent magnet installed on the rotating shaft 210, a stator 230 which accommodates the rotor 220 therein, a coil 240 wound on teeth of the inner circumferential surface of the stator 230, a housing 250 which surrounds the rotating shaft 210, the rotor 220, the stator 230, and the coil 240 to protect them from the outside, and an upper cap 260 and a lower cap 270 coupled to both ends of the housing 250.

The phase voltage lines R, S, and T of the three-phase power cable 300 are Y-connected to the coil 240 and, when power is applied to the coil 240, current flows in the coil 240, and the rotor 220 including the permanent magnet is rotated in a regular direction or a reverse direction depending on the direction of the current flowing in the coil 240, and thus rotates a propeller (not shown), or the like, which is installed on the rotating shaft 210.

In water, leakage current is generated at portions where the phase voltage lines R, S, and T are connected to the coil 240, and when the human body comes into contact with water in which the leakage current flows, an electrical shock accident occurs.

However, in the present invention, the neutral line N of the three-phase power cable 300 connected to the underwater motor 200 is connected to the inner surface of the cylindrical main body 110 formed of the conductive material, and thereby, the area of the neutral line N is increased compared to the area of the phase voltage lines R, S, and T, and the leakage current is restricted by a difference between the area of the phase voltage lines R, S, and T, and the area of the neutral line N.

The reason for this is that, as described in Korean Patent Registration No. 10-1404806 (Publication Date: Jun. 12, 2014) stated in the related art section, as the area of a conductor connected to the negative (−) terminal of a power supply (corresponding to the neutral line N of the present invention) increases compared to a conductor connected to the positive (+) terminal of the power supply (corresponding to the phase voltage lines R, S, and T of the present invention), leakage current gradually decreases.

Specifically, when current leaks through the phase voltage lines R, S, and T of the three-phase power cable 300 configured to supply power to the underwater motor 200, leakage current flows through the phase voltage lines R, S, and T of the three-phase power cable 300→water→the cylindrical main body 110 formed of the conductive material→the neural line N of the three-phase power cable 300.

In this process, current leaking into water from the phase voltage lines R, S, and T of the three-phase power cable 300 does not flow to the human body having a relatively high resistance, but flows to the cylindrical main body 110 formed of the conductive material through water and enters the neutral line N of the three-phase power cable 300, thereby restricting the leakage current so as not to flow to the human body and minimizing the risk of electrical shock accidents.

The ground terminal 120 is mounted on the outer surface of the cylindrical main body 110 formed of the conductive material, and is connected to ground G. For example, the ground terminal 120 may be formed of a dielectric material.

When high voltage is suddenly applied to the underwater motor 200 or overcurrent occurs due to unintentional short circuit and thus leaks to the cylindrical main body 110, the ground terminal 120 causes the high voltage or the overcurrent to flow to the ground G, thereby protecting the underwater motor 200 and preventing electrical shock.

Through this implementation, the present invention may restrict inflow of leakage current leaking from the phase voltage lines R, S, and T of the three-phase power cable connected to the underwater motor into the human body by increasing the area of the neutral line N of the three-phase power cable configured to apply power to the underwater motor, thereby being capable of preventing electrical shock accidents.

As is apparent from the above description, a collection net for restricting leakage current of an underwater motor according to the present invention may restrict inflow of leakage current leaking from phase voltage lines R, S, and T of a three-phase power cable connected to the underwater motor into the human body by increasing the area of a neutral line of the three-phase power cable configured to apply power to the underwater motor, thereby being capable of preventing electrical shock accidents.

The present invention is industrially usable in the field of technology for restricting leakage current of underwater motors and in the field of application technology thereof.

The various embodiments disclosed in this specification and drawings are merely presented as specific examples to aid understanding, and are not intended to limit the scope of the various embodiments of the present invention.

Therefore, although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A collection net for restricting leakage current of an underwater motor, comprising:

a cylindrical main body having a mesh structure and formed of a conductive material, and configured to accommodate the underwater motor therein and to increase an area of a neutral line of a three-phase power cable connected to the underwater motor by connecting the neutral line to an inner surface of the cylindrical main body, so as to collect leakage current leaking from phase voltage lines of the three-phase power cable connected to the underwater motor; and a ground terminal mounted on an outer surface of the cylindrical main body formed of the conductive material, and connected to ground.

2. The collection net according to claim 1, wherein the cylindrical main body formed of the conductive material has a circular cylindrical shape.

3. The collection net according to claim 1, wherein the cylindrical main body formed of the conductive material has a polygonal cylindrical shape.

* * * * *